(12) United States Patent
Nakaya et al.

(10) Patent No.: US 9,902,797 B2
(45) Date of Patent: Feb. 27, 2018

(54) METHOD FOR PRODUCING OXYMETHYLENE COPOLYMER

(71) Applicant: MITSUBISHI GAS CHEMICAL COMPANY, INC., Tokyo (JP)

(72) Inventors: Daigo Nakaya, Tokyo (JP); Tsutomu Miyoshi, Tokyo (JP); Akira Ito, Mie (JP); Satoshi Mochida, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 14/400,075

(22) PCT Filed: May 10, 2013

(86) PCT No.: PCT/JP2013/063183
§ 371 (c)(1),
(2) Date: Nov. 10, 2014

(87) PCT Pub. No.: WO2013/172270
PCT Pub. Date: Nov. 21, 2013

(65) Prior Publication Data
US 2015/0112018 A1    Apr. 23, 2015

(30) Foreign Application Priority Data
May 14, 2012 (JP) ................................ 2012-110761

(51) Int. Cl.
| | |
|---|---|
| *C07C 213/00* | (2006.01) |
| *C08G 4/00* | (2006.01) |
| *C08G 2/10* | (2006.01) |
| *C08G 2/06* | (2006.01) |
| *C08G 2/28* | (2006.01) |
| *C08G 2/30* | (2006.01) |

(52) U.S. Cl.
CPC ............... *C08G 4/00* (2013.01); *C08G 2/06* (2013.01); *C08G 2/10* (2013.01); *C08G 2/28* (2013.01); *C08G 2/30* (2013.01)

(58) Field of Classification Search
CPC ..................................... C08G 2/10; C08G 4/00
See application file for complete search history.

(56) References Cited

U.S. PATENT DOCUMENTS

| | | | |
|---|---|---|---|
| 4,366,305 A * | 12/1982 | Amemiya ................. | C08G 2/36 525/398 |
| 4,547,565 A | 10/1985 | Kasuga et al. | |
| 4,579,935 A | 4/1986 | Kasuga et al. | |
| 5,079,330 A * | 1/1992 | Makabe ................... | C08G 2/18 525/398 |
| 5,202,127 A * | 4/1993 | Takeda .................... | A01N 43/32 424/408 |
| 5,726,276 A * | 3/1998 | Nakai ....................... | C08G 2/06 528/234 |
| 5,741,866 A | 4/1998 | Yahiro et al. | |
| 5,837,781 A | 11/1998 | Tanimura et al. | |
| 2003/0125512 A1* | 7/2003 | Nakamura ............... | C08G 2/18 528/425 |
| 2009/0312466 A1* | 12/2009 | Hase ....................... | C08K 5/005 524/100 |

FOREIGN PATENT DOCUMENTS

| | | |
|---|---|---|
| CN | 1357016 A | 7/2002 |
| CN | 101583666 A | 11/2009 |
| JP | 62-13369 | 3/1987 |
| JP | 3-63965 | 10/1991 |
| JP | 7-286023 | 10/1995 |
| JP | 9-241342 | 9/1997 |
| JP | 10-168144 | 6/1998 |
| JP | 2908693 | 4/1999 |
| JP | 11-269165 | 10/1999 |
| JP | 3309641 | 5/2002 |
| JP | 2005-232404 A | 9/2005 |
| JP | 2008-195755 | 8/2008 |

OTHER PUBLICATIONS

Search report from PCT/JP2013/063183, dated Jul. 16, 2013.
Chinese Office Action issued with respect to application No. 201380024820.8, dated Jul. 22, 2015.
European Search Report issued with respect to application No. 13791675.5, dated Nov. 16, 2015.

* cited by examiner

*Primary Examiner* — Shane Fang
(74) *Attorney, Agent, or Firm* — Greenblum & Bernstein, P.L.C.

(57) ABSTRACT

The present invention is directed to a method for producing an oxymethylene copolymer by subjecting trioxane and 1,3-dioxolane to copolymerization using boron trifluoride or a coordination compound thereof as a catalyst, wherein the copolymerization is conducted in the presence of a steric-hindrance phenol in an amount of 0.006 to 2.0% by weight, based on the weight of the trioxane, using 0.01 to 0.07 mmol of boron trifluoride or a coordination compound thereof as a catalyst, relative to 1 mol of the trioxane, and wherein, at a point in time when the polymerization yield becomes 92% or more, the formed oxymethylene copolymer and a polymerization terminator are contacted to terminate the polymerization.

8 Claims, No Drawings

METHOD FOR PRODUCING OXYMETHYLENE COPOLYMER

FIELD OF THE INVENTION

The present invention relates to a method for producing an oxymethylene copolymer having reduced an unstable portion.

BACKGROUND ART

An oxymethylene polymer has excellent mechanical and thermal properties. Particularly, an oxymethylene copolymer has more excellent heat stability and moldability than those of an oxymethylene homopolymer, and therefore has been used widely as an engineering plastic. With respect to the method for producing an oxymethylene copolymer, a method for producing an oxymethylene copolymer by continuous polymerization has been known in which, using a continuous polymerization apparatus comprising a continuous polymerizer that is connected in series with a terminator mixing machine, trioxane and 1,3-dioxolane are subjected to copolymerization using boron trifluoride or a coordination compound thereof as a catalyst, and when the polymerization yield has reached at least 90%, the formed oxymethylene copolymer, which is desirably not subjected to washing step, is contacted with a polymerization terminator in the terminator mixing machine to terminate the polymerization (see, for example, patent document 1).

Patent document 1 discloses the technique for producing an oxymethylene copolymer having suppressed the formation of an unstable portion using as raw materials 1,3-dioxolane and boron trifluoride which can be industrially inexpensively produced and easily handled. Further, this technique is advantageous in that the polymerization yield is high, and that no washing is performed after termination of the polymerization, making it possible to reduce the cost of the monomer recovery.

Patent document 1 has the following description. 1,3-Dioxolane can be easily handled, as compared to the other comonomers, such as ethylene oxide. Further, in the production of an oxymethylene copolymer, when 1,3-dioxolane is used as a comonomer, the base instability is reduced nearly by half, and simultaneously, the crystallization rate is also reduced nearly by half, as compared to those obtained when using ethylene oxide. That is, 1,3-dioxolane and ethylene oxide exhibit totally different behaviors as comonomers of an oxymethylene copolymer.

In this method, however, as the polymerization yield is increased, the formation of an unstable portion having a formate structure easily affected by heat or hydrolysis proceeds. For this reason, the amount of the unstable portion formed is increased in the copolymer at a higher polymerization yield, adversely affecting the polymer quality of a final product, for example, increasing the amount of formaldehyde generated. Therefore, this method is not satisfactory.

There has been known a technique for subjecting trioxane and a comonomer copolymerizable with trioxane to copolymerization in the presence of a cationically active catalyst, wherein, prior to the polymerization, to monomers is added a steric-hindrance phenol having a molecular weight of 350 or more in an amount of 0.001 to 2.0% by weight, based on the total weight of the monomers, and then the copolymerization is conducted (see, for example, patent document 2). Patent document 2 discloses the technique in which trioxane and 1,3-dioxolane are subjected to copolymerization using an ether coordination compound of boron trifluoride as a catalyst in the presence of a steric-hindrance phenol, improving the alkali decomposition rate and weight loss on heating.

Further, there has been known a technique for subjecting trioxane and 1,3-dioxolane to copolymerization using an ether coordination compound of boron trifluoride as a catalyst, wherein the copolymerization is conducted using 1,3-dioxolane having preliminarily added thereto a steric-hindrance phenol having a molecular weight of 350 or more (see, for example, patent documents 3 and 4). However, in all these techniques, the polymerization yield is as low as 85% or less, and further washing is performed simultaneously with termination of the polymerization, and hence a large amount of energy is required for recovering the unreacted monomers, which is disadvantageous from an economical point of view. Therefore, there has been desired the development of a method for producing an oxymethylene copolymer by subjecting trioxane and 1,3-dioxolane to copolymerization using an ether coordination compound of boron trifluoride as a catalyst, which method is advantageous not only in that the polymer quality is improved, for example, the formation of an unstable portion having a formate structure easily affected by heat or hydrolysis is suppressed to reduce the amount of formaldehyde generated, but also in that the polymerization yield is increased.

PRIOR ART REFERENCES

Patent Documents

Patent document 1: Japanese Patent No. 3309641
Patent document 2: Japanese Examined Patent Publication No. Hei 3-63965
Patent document 3: Japanese Patent No. 2908693
Patent document 4: Japanese Unexamined Patent Publication No. Hei 11-269165

SUMMARY OF THE INVENTION

Problems to be Solved by the Invention

In view of the above, an object of the present invention is to continuously produce in high polymerization yield an oxymethylene copolymer having improved polymer quality such that, for example, the formation of an unstable structure easily affected by heat or hydrolysis due to a formate structure is suppressed, reducing the amount of formaldehyde generated.

Means to Solve the Problems

The present inventors have conducted extensive and intensive studies with a view toward solving the above-mentioned problems. As a result, it has been found that the above object can be achieved by a method for producing an oxymethylene copolymer by subjecting trioxane and 1,3-dioxolane to copolymerization using boron trifluoride or a coordination compound thereof as a catalyst, comprising: conducting the copolymerization in the presence of a steric-hindrance phenol in a specific amount, and contacting a polymerization terminator with the oxymethylene copolymer to terminate the polymerization when the polymerization yield has reached a specific value, and the present invention has been completed.

Specifically, the present invention is directed to a method for producing an oxymethylene copolymer by subjecting trioxane and 1,3-dioxolane to copolymerization using boron trifluoride or a coordination compound thereof as a catalyst, comprising: conducting the copolymerization in the presence of a steric-hindrance phenol in an amount of 0.006 to 2.0% by weight, based on the weight of the trioxane, using 0.01 to 0.07 mmol of boron trifluoride or a coordination compound thereof as a catalyst, relative to 1 mol of the trioxane, and
contacting the formed oxymethylene copolymer with a polymerization terminator to terminate the polymerization when the polymerization yield has reached at least 92%.

Effect of the Invention

By the method for producing an oxymethylene copolymer of the present invention, in the copolymerization of trioxane and 1,3-dioxolane using an ether coordination compound of boron trifluoride as a catalyst, the formation of an unstable portion having a formate structure easily affected by heat or hydrolysis can be suppressed, improving the polymer quality, for example, reducing the amount of formaldehyde generated. Further, in the method of the present invention, the polymerization yield can be increased, and thus the cost of the monomer recovery can be reduced, and this is of great commercial significance.

MODE FOR CARRYING OUT THE INVENTION

A characteristic feature of the present invention resides in that the copolymerization of trioxane and 1,3-dioxolane using boron trifluoride or a coordination compound thereof as a catalyst is conducted in the presence of a steric-hindrance phenol in a specific amount, and further the polymerization is terminated when the polymerization yield has reached at least 92%. Hereinbelow, the present invention will be described in detail.

In the present invention, with respect to the method for producing trioxane used as a monomer, there is no particular limitation, but trioxane is a cyclic trimer of formaldehyde. The trioxane generally contains 0.00001 to 0.003 mmol, preferably 0.00001 to 0.0005 mmol, more preferably 0.00001 to 0.0003 mmol of an amine as a stabilizer, relative to 1 mol of the trioxane. When the amount of the amine contained in the trioxane is more than 0.003 mmol, an adverse effect, such as deactivation of the catalyst, is caused, and, when the amount of the amine contained is less than 0.00001 mmol, an adverse effect, such as generation of paraformaldehyde during the storage of the trioxane, is caused.

In the present invention, with respect to the amine to be contained in the trioxane, a primary amine, a secondary amine, a tertiary amine, an alkylated melamine, and a hindered amine compound are used individually or in combination. As a primary amine, for example, n-propylamine, isopropylamine, or n-butylamine is preferably used, as a secondary amine, for example, diethylamine, di-n-propylamine, diisopropylamine, di-n-butylamine, piperidine, or morpholine is preferably used, as a tertiary amine, for example, triethylamine, tri-n-propylamine, triisopropylamine, tri-n-butylamine, or triethanolamine is preferably used, and, as an alkylated melamine, mono-, di-, tri-, tetra-, penta-, or hexamethoxymethylmelamine which is a methoxymethyl-substituted product of melamine, or a mixture thereof is preferably used. As a hindered amine compound, for example, bis(2,2,6,6-tetramethyl-4-piperidinyl) sebacate, bis(1,2,2,6,6-pentamethyl-4-piperidinyl) sebacate, tetrakis (2,2,6,6-tetramethyl-4-piperidinyl) 1,2,3,4-butanetetracarboxylate, poly{[6-(1,1,3,3-tetramethylbutyl)amino-1,3,5-triazine-2,4-diyl][(2,2,6,6-tetramethyl-4-piperidinyl)imino] hexamethylene[(2,2,6,6-tetramethyl-4-piperidinyl)imino]}, 1,2,2,6,6,-pentamethylpiperidine, a polycondensation product of dimethyl succinate and 1-(2-hydroxyethyl)-4-hydroxy-2,2,6,6-tetramethylpiperidine, or a condensation product of N,N'-bis(3-aminopropyl)ethylenediamine and 2,4-bis[N-butyl-N-(1,2,2,6,6-pentamethyl-4-piperidyl) amino]-1,3,5-triazine is preferably used. Of these, triethanolamine is most preferably used.

In the present invention, 1,3-dioxolane is used as a comonomer in an amount of 0.4 to 45% by weight, preferably 1.2 to 12% by weight, most preferably 2.5 to 6% by weight, based on the weight of the trioxane. When the amount of the 1,3-dioxolane used is more than 45% by weight, the polymerization yield and crystallization rate are lowered, and, when the amount of the 1,3-dioxolane used is less than 0.4% by weight, an unstable portion is increased.

The catalyst used in the present invention is boron trifluoride or a coordination compound thereof. As examples of coordination compounds of boron trifluoride, there can be mentioned coordination compounds of boron trifluoride with an organic compound having an oxygen atom or a sulfur atom. Examples of the above organic compounds include alcohols, phenols, acids, ethers, acid anhydrides, esters, ketones, aldehydes, and dialkyl sulfides. Of these, as a coordination compound of boron trifluoride, an etherate is preferred, and specific preferred examples include ethyl etherate and butyl etherate of boron trifluoride. The amount of the catalyst added is, relative to 1 mol of trioxane as a main monomer, generally in the range of from 0.01 to 0.07 mmol, preferably 0.02 to 0.06 mmol, most preferably 0.03 to 0.055 mmol. When the amount of the catalyst added is more than 0.07 mmol, an adverse effect, such as an increase of the formate structure, is caused, and, when the amount of the catalyst added is less than 0.01 mmol, an adverse effect, such as a lowering of the conversion in polymerization, is caused. The catalyst is used in an independent form or in the form of a solution. When the catalyst is used in the form of a solution, examples of solvents for the solution include aliphatic hydrocarbons, such as hexane, heptane, and cyclohexane; aromatic hydrocarbons, such as benzene, toluene, and xylene; and hydrocarbon halides, such as methylene dichloride and ethylene dichloride.

In the present invention, the intrinsic viscosity of the copolymer is adjusted to 0.5 to 5 dl/g, preferably adjusted to 0.7 to 3 dl/g, more preferably 0.8 to 2 dl/g.

For controlling the molecular weight of the copolymer to adjust the intrinsic viscosity, a molecular weight modifier (chain transfer agent) can be used in an amount of 0.01 to 0.3 mol %, based on the trioxane. Examples of chain transfer agents include carboxylic acids, carboxylic anhydrides, esters, amides, imides, phenols, and acetal compounds. Particularly, phenol, 2,6-dimethylphenol, methylal, and polyoxymethylene dimethoxide are preferably used. Most preferred is methylal. The chain transfer agent is used in an independent form or in the form of a solution. When the chain transfer agent is used in the form of a solution, examples of solvents for the solution include aliphatic hydrocarbons, such as hexane, heptane, and cyclohexane; aromatic hydrocarbons, such as benzene, toluene, and xylene; and hydrocarbon halides, such as methylene dichloride and ethylene dichloride.

In the present invention, the polymerization time is generally 0.25 to 120 minutes, preferably 1 to 60 minutes, more preferably 1 to 30 minutes, most preferably 2 to 15 minutes. When the polymerization time is longer than the above range, an unstable portion is increased, and, when the polymerization time is shorter than the above range, the polymerization yield is lowered.

Impurities contained in trioxane, such as water, formic acid, methanol, and formaldehyde, are inevitably generated when industrially producing the trioxane, and the content of the total of the impurities in trioxane is preferably 100 ppm or less, more preferably 70 ppm or less, most preferably 50 ppm or less. Particularly, the content of water in trioxane is preferably 50 ppm or less, more preferably 20 ppm or less, most preferably 10 ppm or less. Further, with respect to 1,3-dioxolane, like trioxane, the content of the total of impurities, such as water, formic acid, and formaldehyde, in 1,3-dioxolane is preferably 1,000 ppm or less, more preferably 200 ppm or less, especially preferably 100 ppm or less, most preferably 50 ppm or less. Further, water lowers the activity of the catalyst, and therefore a method is preferably employed in which water is prevented from going from the outside into the polymerization apparatus. As an example of such a method, there can be mentioned a method in which the polymerization apparatus is always purged with inert gas, such as nitrogen gas, during the polymerization reaction.

In the present invention, the polymerization reaction can be a solution polymerization performed in the presence of an inert solvent, but is preferably a bulk polymerization performed using substantially no solvent because the cost of the solvent recovery is not required and the steric-hindrance phenol exhibits a large effect. When a solvent is used, examples of solvents include aliphatic hydrocarbons, such as hexane, heptane, and cyclohexane; aromatic hydrocarbons, such as benzene, toluene, and xylene; and hydrocarbon halides, such as methylene dichloride and ethylene dichloride.

In the present invention, the polymerization reaction is preferably conducted in a continuous manner. In this case, preferred is a method in which the polymerization reaction is conducted using two or more continuous polymerizers connected in series. As a preferred example of the continuous polymerizer, there can be mentioned a kneader having at least two horizontal rotating shafts and having in each rotating shaft a blade having a screw or a paddle incorporated thereinto.

In the present invention, the copolymerization is conducted in the presence of a steric-hindrance phenol, and the amount of the steric-hindrance phenol added is generally 0.006 to 2.0% by weight, preferably 0.01 to 0.5% by weight, more preferably 0.02 to 0.1% by weight, based on the trioxane. When the amount of the steric-hindrance phenol used is more than 2.0% by weight, an adverse effect, such as a lowering of the molecular weight of the formed oxymethylene copolymer, or a lowering of the polymerization yield, is caused. When the amount of the steric-hindrance phenol used is less than 0.006% by weight, an adverse effect is caused, for example, an unstable portion, such as a formate structure, is increased in the formed oxymethylene copolymer, so that the oxymethylene copolymer becomes poor in heat or hydrolytic stability.

The steric-hindrance phenol is added in an independent form or in the form of a solution to the polymerizer. When the steric-hindrance phenol is used in the form of a solution, examples of solvents for the solution include aliphatic hydrocarbons, such as hexane, heptane, and cyclohexane; aromatic hydrocarbons, such as benzene, toluene, and xylene; hydrocarbon halides, such as methylene dichloride and ethylene dichloride; and trioxane as a monomer and 1,3-dioxolane as a comonomer. For maintaining the activity of the steric-hindrance phenol during the polymerization reaction, it is desired that the steric-hindrance phenol is added in an independent form or in the form of a solution through an inlet of a polymerizer.

As examples of the steric-hindrance phenols used in the polymerization in the present invention, there can be mentioned one or more types of steric-hindrance phenols, such as dibutylhydroxytoluene, triethylene glycol bis-3-(3-t-butyl-4-hydroxy-5-methylphenyl)propionate, pentaerythrityl tetrakis-3-(3,5-di-t-butyl-4-hydroxyphenyl)propionate, hexamethylenebis[3-(3,5-di-t-butyl-4-hydroxyphenyl) propionate], 2,2'-methylenebis(6-t-butyl-4-methylphenol), 3,9-bis {2-[3-(3-t-butyl-4-hydroxy-5-methylphenyl) propionyloxy]-1,1-dimethylethyl}-2,4,8,10-tetraoxaspiro [5.5]undecane, N,N'-hexane-1,6-diylbis[3-(3,5-di-t-butyl-4-hydroxyphenyl)propionamide], 1,6-hexanediyl 3,5-bis(1,1-dimethylethyl)-4-hydroxybenzenepropionate, and 2-[1-(2-hydroxy-3,5-di-t-pentylphenyl)ethyl]-4,6-di-t-pentylphenyl acrylate. Of these, triethylene glycol bis-3-(3-t-butyl-4-hydroxy-5-methylphenyl)propionate, pentaerythrityl tetrakis-3-(3,5-di-t-butyl-4-hydroxyphenyl)propionate, and 3,9-bis {2-[3-(3-t-butyl-4-hydroxy-5-methylphenyl)propionyloxy]-1,1-dimethylethyl}-2,4,8,10-tetraoxaspiro[5.5]undecane are preferably used, and triethylene glycol bis-3-(3-t-butyl-4-hydroxy-5-methylphenyl)propionate is most preferably used.

In the present invention, the catalyst is deactivated to terminate the polymerization when the polymerization yield has reached generally at least 92%, preferably at least 95%, more preferably at least 97%. When the polymerization yield reaches at least 92%, a large amount of energy consumption for recovering the unreacted monomers can be reduced, and this is of great commercial significance.

In the method for producing an oxymethylene copolymer by subjecting trioxane and 1,3-dioxolane to copolymerization using boron trifluoride or a coordination compound thereof as a catalyst, wherein the formed oxymethylene copolymer and a polymerization terminator are contacted to terminate the polymerization, when the polymerization is terminated at a time point that the polymerization yield is less than 92%, an unstable portion having a formate structure easily affected by heat or hydrolysis is formed in a small amount in the oxymethylene copolymer, and hence the addition of a steric-hindrance phenol has almost no effect, and further the very large cost of the unreacted monomer recovery is required. In the prior art, when the polymerization is terminated at a time point that the polymerization yield is 92% or more, an unstable portion having a formate structure easily affected by heat or hydrolysis is vigorously formed in the oxymethylene copolymer. However, it has unexpectedly been found that, by conducting the copolymerization using a specific amount of a catalyst in the presence of a specific amount of a steric-hindrance phenol and terminating the polymerization when the polymerization yield has reached at least 92%, the amount of an unstable portion having a formate structure formed in the oxymethylene copolymer can be drastically reduced. Further, the polymerization yield is high so that the cost of the unreacted monomer recovery can be reduced.

From the viewpoint of the polymer quality of a final product, such as the amount of formalin generated or resident heat stability, the formate group content of the polymer obtained after termination of the polymerization is desirably 10 µmol or less, more desirably 9 µmol or less, most desirably 8 µmol or less, relative to 1 g of the polymer.

Termination of the polymerization reaction is made by contacting a terminator with the oxymethylene copolymer.

The terminator is used as such or in the form of a solution or a suspension, and a contacting method is desired in which a terminator in a small amount or a solution or suspension of a terminator is continuously added to the oxymethylene copolymer and ground so that the terminator and the copolymer are contacted with each other. When a washing step in which, for example, the oxymethylene copolymer is introduced into a large amount of a solution or suspension of a terminator is performed for termination of the polymerization reaction, a solvent recovery step or a solvent removal step is required in the subsequent stage, and thus the process becomes complicated and the facilities are inevitably increased, which is disadvantageous from a commercial point of view. A method in which a terminator in a small amount is added to the oxymethylene copolymer upon termination of the polymerization is more preferred from a commercial point of view. The terminator is added to the oxymethylene copolymer, and then preferably mixed using a mixer. As a mixer, a continuous mixer, such as a single- or twin-screw or paddle mixer, can be used.

With respect to the terminator, a primary amine, a secondary amine, a tertiary amine, an alkylated melamine, a hindered amine compound, a trivalent organophosphorus compound, and an alkali metal or alkaline earth metal hydroxide are used individually or in combination. As a primary amine, for example, n-propylamine, isopropylamine, or n-butylamine is preferably used, as a secondary amine, for example, diethylamine, di-n-propylamine, diisopropylamine, di-n-butylamine, piperidine, or morpholine is preferably used, as a tertiary amine, for example, triethylamine, tri-n-propylamine, triisopropylamine, or tri-n-butylamine is preferably used, and, as an alkylated melamine, mono-, di-, tri-, tetra-, penta-, or hexamethoxymethylmelamine which is a methoxymethyl-substituted product of melamine, or a mixture thereof is preferably used. As a hindered amine compound, for example, bis(2,2,6,6-tetramethyl-4-piperidinyl) sebacate, bis(1,2,2,6,6-pentamethyl-4-piperidinyl) sebacate, tetrakis(2,2,6,6-tetramethyl-4-piperidinyl) 1,2,3,4-butanetetracarboxylate, poly{[6-(1,1,3,3-tetramethylbutyl)amino-1,3,5-triazine-2,4-diyl][(2,2,6,6-tetramethyl-4-piperidinyl)imino]hexamethylene[(2,2,6,6-tetramethyl-4-piperidinyl)imino]}, 1,2,2,6,6,-pentamethylpiperidine, a polycondensation product of dimethyl succinate and 1-(2-hydroxyethyl)-4-hydroxy-2,2,6,6-tetramethylpiperidine, or a condensation product of N,N'-bis(3-aminopropyl)ethylenediamine and 2,4-bis[N-butyl-N-(1,2,2,6,6-pentamethyl-4-piperidyl)amino]-1,3,5-triazine is preferably used.

Of these, from the viewpoint of the hue, a hindered amine compound, a trivalent organophosphorus compound, and an alkylated melamine are preferred. As a hindered amine compound, bis(2,2,6,6-tetramethyl-4-piperidinyl) sebacate, bis(1,2,2,6,6-pentamethyl-4-piperidinyl) sebacate, a polycondensation product of dimethyl succinate and 1-(2-hydroxyethyl)-4-hydroxy-2,2,6,6-tetramethylpiperidine, or a condensation product of N,N'-bis(3-aminopropyl)ethylenediamine and 2,4-bis[N-butyl-N-(1,2,2,6,6-pentamethyl-4-piperidyl)amino]-1,3,5-triazine is most preferably used, as a trivalent organophosphorus compound, triphenylphosphine is most preferably used, and, as an alkylated melamine, hexamethoxymethylmelamine is most preferably used. When the terminator is used in the form of a solution or a suspension, the solvent used in the solution or suspension is not particularly limited, and water, alcohols, and various aliphatic and aromatic organic solvents, such as acetone, methyl ethyl ketone, hexane, cyclohexane, heptane, benzene, toluene, xylene, methylene dichloride, and ethylene dichloride, can be used. Of these, preferred are water, alcohols, and aliphatic and aromatic organic solvents, such as acetone, methyl ethyl ketone, hexane, cyclohexane, heptane, benzene, toluene, and xylene.

In the present invention, the oxymethylene copolymer pellets as a final product have an unstable portion in an amount of 1.5% or less, generally 1.4 to 0.1%, as measured by a method for, e.g., the below-mentioned weight loss on heating (M value), and the amount of the unstable portion is small.

Further, after termination of the polymerization, the oxymethylene copolymer can be obtained at high yield, and therefore the copolymer as such can be transferred to the subsequent stabilization step. In the stabilization step, stabilization methods described in items (1) and (2) below can be employed.
(1) Method in which the above-obtained oxymethylene copolymer is melted by heating to remove the unstable portion.
(2) Method in which the above-obtained oxymethylene copolymer is hydrolyzed in an aqueous medium to remove the unstable portion.

The copolymer is stabilized by the above method, and then pelletized, making it possible to obtain a stabilized, moldable oxymethylene copolymer.

In the above-mentioned methods, the process in method (1) is simple, as compared to that in method (2), and is preferred as an industrial method. Specifically, when method (1) is employed, it is preferred that the oxymethylene copolymer is melt-kneaded at a temperature in the range of from the melting temperature of the oxymethylene copolymer to a temperature 100° C. higher than the melting temperature under a pressure of 760 to 0.1 mmHg. When the stabilization treatment temperature is lower than the melting temperature of the oxymethylene copolymer, a decomposition reaction of the unstable portion is unsatisfactory so that a stabilization effect cannot be obtained. On the other hand, when the treatment temperature is 100° C. or more higher than the melting temperature of the oxymethylene copolymer, a disadvantage is caused in that yellowing occurs or the polymer backbone is decomposed due to heat, and further an unstable portion is formed to lower the heat stability. A more preferred range is from 170 to 250° C., and a most preferred range is from 180 to 235° C. When the pressure for the stabilization treatment is higher than 760 mmHg, the effect of removing the decomposition product gas caused by decomposition of the unstable portion from the system is so poor that a satisfactory stabilization effect cannot be obtained. On the other hand, when the pressure is lower than 0.1 mmHg, there are disadvantages not only in that an expensive apparatus is needed for achieving such a high degree of vacuum to cause a commercial disadvantage, but also in that the molten resin is likely to flow through a vacuum vent to cause operational troubles. A more preferred range is from 740 to 10 mmHg, and a most preferred range is from 400 to 50 mmHg. Further, the treatment time is appropriately selected from a period of time in the range of from 5 minutes to 1 hour.

Further, in the present invention, as an apparatus used in the above-mentioned stabilization treatment, a single-screw or twin- or multi-screw vented extruder can be used. For obtaining a required residence time, a method of arranging two or more extruders in series is an advantageous method. A method of using extruders having high degassing effect, such as ZSK extruder, ZDS extruder, manufactured by Werner GmbH & Co., in combination is a further advantageous method. Further, a method of using a surface renewal-type mixer shown in the below-described Examples and the above-mentioned extruder in combination is the most effective method.

In the stabilization method (1) above, a stabilizer, such as an antioxidant or a heat stabilizer, can be added to the oxymethylene copolymer during melt-kneading to effect the stabilization treatment.

As examples of antioxidants usable in the above-mentioned stabilization treatment, there can be mentioned one or more types of steric-hindrance phenols, such as triethylene glycol bis-3-(3-t-butyl-4-hydroxy-5-methylphenyl)propionate, pentaerythrityl tetrakis-3-(3,5-di-t-butyl-4-hydroxyphenyl)propionate, 2,2'-methylenebis(6-t-butyl-4-methylphenol), 3,9-bis{2-[3-(3-t-butyl-4-hydroxy-5-methylphenyl)propionyloxy]-1,1-dimethylethyl}-2,4,8,10-tetraoxaspiro[5.5]undecane, N,N'-hexane-1,6-diylbis[3-(3,5-di-t-butyl-4-hydroxyphenyl)propionamide], and 1,6-hexanediyl 3,5-bis(1,1-dimethylethyl)-4-hydroxybenzenepropionate. Examples of heat stabilizers include amine-substituted triazines, such as melamine, methylolmelamine, benzoguanamine, cyanoguanidine, and an N,N-diarylmelamine, polyamides, urea derivatives, urethanes, and inorganic acid salts, hydroxides, and organic acid salts of sodium, potassium, calcium, magnesium, or barium.

The oxymethylene copolymer obtained by the method of the present invention descried above in detail has properties as excellent as those of an oxymethylene copolymer obtained by a conventional method, and can be used in the same applications as those for such an oxymethylene copolymer.

Further, in the oxymethylene copolymer produced by the method of the present invention, an additive, for example, a coloring agent, a nucleating agent, a plasticizer, a release agent, a fluorescent brightening agent, an antistatic agent, such as polyethylene glycol or glycerol, or a light stabilizer, such as a benzophenone compound or a hindered amine compound, can be added if desired.

EXAMPLES

Hereinbelow, the present invention will be described with reference to the following Examples and Comparative Examples, which should not be construed as limiting the scope of the present invention. The terms and measurement methods shown in the Examples and Comparative Examples are described below.

(1) Formate Group Content:

About 12 mg of a crude polymer powder, which is an oxymethylene copolymer before subjected to stabilization treatment, was weighed, and dissolved in 1 g of a hexafluoroisopropanol-$d_2$ solvent and subjected to measurement by means of a $^1$H-NMR nuclear magnetic resonance apparatus (JNM LA500; manufactured by JEOL LTD.). A formate group content was determined from a ratio of the area of a $^1$H peak appearing around 8.0 ppm ascribed to the formate group to the area of a $^1$H peak appearing around 4.9 ppm ascribed to the methylene backbone of the oxymethylene copolymer in the NMR chart. The content of the formate group in 1 g of the polymer was indicated using a unit: μmol.

(2) Polymerization Yield:

20 g of the oxymethylene copolymer obtained after the termination treatment was immersed in 20 ml of acetone, and then subjected to filtration, and the collected copolymer was washed with acetone three times and then, subjected to vacuum drying at 60° C. until the weight of the dried copolymer became constant. Then, the resultant copolymer was accurately weighed, and a polymerization yield was determined from the following formula.

$$\text{Polymerization yield} = M1/M0 \times 100$$

M0: Weight before washing with acetone
M1: Weight after washing with acetone and drying (3) Intrinsic Viscosity:

The oxymethylene copolymer was dissolved in an amount of 0.1% by weight in a p-chlorophenol solvent having added thereto α-pinene in an amount of 2%, and measured with respect to an intrinsic viscosity at 60° C. by means of an Ostwald's viscometer.

(4) Melt Index (MI Value):

A melt index was measured in accordance with ASTM-D1238 (at 190° C. under a load of 2.16 kg).

(5) Amount of Formaldehyde Generated:

The obtained pellets were subjected to molding using a molding machine PS-40E5ASE, manufactured by Nissei Plastic Industrial Co., Ltd., at a cylinder temperature of 200° C., and the resultant flat plate having a size of 100 mm×40 mm×thickness: 2 mm was used as a test specimen. After one day from the molding, with respect to the resultant specimen, an amount of formaldehyde generated was measured in accordance with the method described in German Automobile Industry Association standards VDA275 (quantitative determination of an amount of formaldehyde emission by the automobile interior parts—revised flask method).

(i) 50 ml of distilled water is placed in a polyethylene container, and a specimen is hung above the water in the container, and the container is closed with a cover and kept in a sealed state at 60° C. for 3 hours.

(ii) Then, the container is allowed to stand at room temperature for 60 minutes, and then the specimen is removed from the container.

(iii) A concentration of formaldehyde absorbed in the distilled water in the polyethylene container is measured by an acetylacetone colorimetric method using a UV spectrometer.

(6) Resident Heat Stability:

The stabilized oxymethylene copolymer was kneaded and extruded to produce pellets, and the resultant pellets were dried at 80° C. for 4 hours, and then 6 shots of the resin were allowed to stay in an injection molding machine (IS75E, manufactured by Toshiba Machine Co., Ltd.) having a cylinder temperature of 240° C., and molded every 7 minutes, and the resident heat stability was evaluated by a period of time (minutes) required until a silver streak was caused due to foaming of the resin. Further, the resultant molded article was visually observed with respect to hue.

(7) Weight Loss on Heating (M Value):

The weight loss on heating indicates a weight loss (%) measured by kneading and extruding the stabilized oxymethylene copolymer to produce pellets, and placing the resultant pellets in a test tube, and purging the test tube with nitrogen and then heating the pellets at 240° C. under a reduced pressure at 10 Torr for 2 hours. The higher the heat stability, the smaller the weight loss on heating (M value).

Examples 1 to 9 and Comparative Examples 1 to 8

Using, as a polymerization apparatus, a bench twin-shaft kneader having an inner capacity of 1 L and having a jacket and two Z-type blades, an oxymethylene copolymer was produced by polymerization in a batch-wise manner. Hot water at 85° C. was circulated through the jacket, and further the inside of the apparatus was heated and dried using high-temperature air, and then a cover was attached to the apparatus and the system was purged with nitrogen. 320 g of trioxane (which contains 0.00025 mmol of triethanolamine as a stabilizer relative to 1 mol of the trioxane), a predetermined amount of a comonomer, and a predetermined amount of a steric-hindrance phenol were charged through a raw material inlet, and, while stirring the resultant mixture by Z-type blades, a predetermined amount of boron trifluoride diethyl etherate in the form of a benzene solution (solution concentration: 0.6 mmol/g) was added to the mixture to initiate a polymerization. After the polymerization was conducted for a predetermined period of time, a solution of triphenylphosphine in benzene (solution concentration: 5 mmol/ml) in a molar amount corresponding to 10 times the molar amount of the catalyst used was added to the polymerization apparatus using a syringe, and mixed for 15 minutes to terminate the polymerization, obtaining an oxymethylene copolymer. With respect to the obtained oxymethylene copolymer, a polymerization yield and a formate group content were measured, and the results as well as the reaction conditions were shown in Tables 1 to 3.

Examples 10 to 15 and Comparative Example 9

As a continuous polymerization apparatus, two polymerizers were connected in series, wherein each polymerizer has a long casing having an inner cross-section seen like two circles which partially overlap, and an inner cross-section major diameter of 100 mm, and having a jacket around it, wherein the long casing has therein a pair of shafts, each shaft having incorporated thereto a number of convex lens-type paddles meshing with one another, and the end of the convex lens-type paddle can clean the inner surface of the casing and the surface of the convex lens-type paddle meshing with that paddle. Subsequently, as a terminator mixing machine, a continuous mixer, which has a structure similar to the above polymerizer on the second stage, and which can charge a solution containing a terminator through a feed inlet portion to continuously mix the terminator with the polymer, was connected in series to the above-mentioned two continuous polymerizers, and production of an oxymethylene copolymer was performed. To the inlet of the first-stage polymerizer was fed trioxane at 200 kg/hr (which contains 0.00025 mmol of triethanolamine as a stabilizer relative to 1 mol of the trioxane), and a steric-hindrance phenol was fed in the form of a 11 wt % 1,3-dioxolane solution so that the steric-hindrance phenol of the type and amount shown in Table 4 was fed. Further, 1,3-dioxolane was continuously fed through another line and controlled so that the total amount of the 1,3-dioxolane fed became 8 kg/hr. Simultaneously, as a catalyst, 0.043 mmol of boron trifluoride diethyl etherate relative to 1 mol of the trioxane was continuously fed. Further, as a molecular weight modifier, methylal in an amount required to adjust the intrinsic viscosity to 1.1 to 1.5 dl/g was continuously fed. Boron trifluoride diethyl etherate and methylal were added individually in the form of a benzene solution. The total amount of the benzene used was 1% by weight or less, based on the weight of the trioxane. Then, the terminator shown in Table 4 in a molar amount 2 times the molar amount of the catalyst used was continuously fed in the form of a benzene solution through the inlet of the terminator mixing machine to terminate the polymerization reaction, and the formed oxymethylene copolymer was obtained from the outlet. The continuous polymerization apparatus was operated for polymerization under conditions such that the number of revolutions of the first-stage shaft was about 35 rpm, the number of revolutions of the second-stage shaft was about 60 rpm, the first-stage jacket temperature was 85° C., the second-stage jacket temperature was 85° C., and the terminator mixing machine jacket temperature was 15° C. The polymerization time was about 10 minutes. With respect to the obtained oxymethylene copolymer, a polymerization yield, an intrinsic viscosity, and a formate group content were measured, and the results were shown in Table 4.

Example 16

To 100 parts by weight of the oxymethylene copolymer obtained in Example 12 were added 0.1 part by weight of melamine, 0.3 part by weight of triethylene glycol bis-3-(3-t-butyl-4-hydroxy-5-methylphenyl)propionate, 0.05 part by weight of magnesium hydroxide, and 0.005 part by weight of calcium stearate, and they were mixed with one another, and then the resultant mixture was fed to a twin-screw vented extruder (50 mmφ, L/D=49), and melt-kneaded under a reduced pressure at 160 mmHg at 200° C., and subsequently fed to a surface renewal-type mixer and further stabilized at 220° C. under a reduced pressure at 160 mmHg. The surface renewal-type mixer has two rotating shafts inside the mixer, each shaft having a plurality of scraper blades fitted thereto, and the blades are fitted so that the blades are not in contact when the shafts are rotated in different directions, and arranged so that the shafts are rotated while maintaining a slight gap between the ends of the blades and the inner surface of the casing or the both shafts. The surface renewal-type mixer has a function such that the rotation of the shafts kneads the polymer and constantly renews the surface of the molten polymer so that the volatile components easily volatilize. The average residence time from the inlet of the twin-screw extruder to the outlet of the surface renewal-type mixer was 25 minutes. The stabilized oxymethylene copolymer was pelletized by extrusion from a dice. An amount of formaldehyde generated from the obtained pellets was measured. As a result, the amount of formaldehyde generated was found to be 3.1 μg/g-polymer. With respect to the obtained pellets, the MI value was 9.5, the M value was 0.9%, and the resident heat stability was 42 minutes.

Comparative Example 10

Substantially the same procedure as in Example 16 was repeated except that the oxymethylene copolymer obtained in Comparative Example 9 was used. An amount of formaldehyde generated from the obtained pellets was measured. As a result, the amount of formaldehyde generated was found to be 5.2 μg/g-polymer. With respect to the obtained pellets, the MI value was 9.7, the M value was 1.6%, and the resident heat stability was 28 minutes.

TABLE 1

| | Comonomer | | Steric-hindrance phenol | | Boron trifluoride diethyl etherate | | | |
|---|---|---|---|---|---|---|---|---|
| | Type | Amount (wt %) | Type | Amount based on TOX (wt %) | Amount relative to TOX (mmol/mol-TOX) | Polymerization time sec. | Polymerization yield wt % | Formate group content μmol/g-polymer |
| Example 1 | DOL | 4.0 | HP-1 | 0.0150 | 0.05 | 250 | 92.4 | 3.7 |
| Example 2 | DOL | 4.0 | HP-1 | 0.0150 | 0.05 | 380 | 97.3 | 5.6 |
| Example 3 | DOL | 4.0 | HP-1 | 0.0150 | 0.05 | 900 | 99.2 | 7.0 |
| Comparative example 1 | DOL | 4.0 | Not added | | 0.05 | 250 | 92.3 | 4.6 |
| Comparative example 2 | DOL | 4.0 | Not added | | 0.05 | 380 | 97.1 | 8.9 |
| Comparative example 3 | DOL | 4.0 | Not added | | 0.05 | 900 | 99.6 | 11.1 |

TABLE 2

| | Comonomer | | Steric-hindrance phenol | | Boron trifluoride diethyl etherate | | | |
|---|---|---|---|---|---|---|---|---|
| | Type | Amount (wt %) | Type | Amount based on TOX (wt %) | Amount relative to TOX (mmol/mol-TOX) | Polymerization time sec. | Polymerization yield wt % | Formate group content μmol/g-polymer |
| Example 4 | DOL | 4.0 | HP-1 | 0.0150 | 0.02 | 900 | 92.3 | 3.5 |
| Comparative example 4 | DOL | 4.0 | HP-1 | 0.0150 | 0.087 | 900 | 99.7 | 12.9 |

TABLE 3

| | Comonomer | | Steric-hindrance phenol | | Boron trifluoride diethyl etherate | | | |
|---|---|---|---|---|---|---|---|---|
| | Type | Amount (wt %) | Type | Amount based on TOX (wt %) | Amount relative to TOX (mmol/mol-TOX) | Polymerization time sec. | Polymerization yield wt % | Formate group content μmol/g-polymer |
| Example 5 | DOL | 4.0 | HP-2 | 0.0213 | 0.05 | 900 | 99.6 | 7.1 |
| Example 6 | DOL | 4.0 | HP-3 | 0.0154 | 0.05 | 900 | 99.4 | 8.6 |
| Example 7 | DOL | 4.0 | HP-4 | 0.0928 | 0.05 | 900 | 98.4 | 8.8 |
| Example 8 | DOL | 4.0 | HP-5 | 0.0145 | 0.05 | 900 | 99.5 | 7.0 |
| Example 9 | DOL | 4.0 | HP-6 | 0.0111 | 0.05 | 900 | 99.7 | 8.3 |
| Comparative example 5 | EO | 2.4 | HP-1 | 0.0150 | 0.087 | 900 | 91.0 | 19.4 |
| Comparative example 6 | EO | 2.4 | HP-1 | 0.0150 | 0.05 | 900 | 74.0 | 14.5 |
| Comparative example 7 | DOL | 4.0 | HP-1 | 0.0150 | 0.05 | 85 | 80.0 | 2.1 |
| Comparative example 8 | DOL | 4.0 | Not added | | 0.05 | 85 | 80.1 | 2.1 |

The abbreviations used in the tables above have the following meanings:

TOX: 1,3,5-Trioxane

DOL: 1,3-Dioxolane

EO: Ethylene oxide

HP-1: Triethylene glycol bis-3-(3-t-butyl-4-hydroxy-5-methylphenyl)propionate (trade name: Irganox 245; manufactured by BASF AG)

HP-2: Pentaerythrityl tetrakis-3-(3,5-di-t-butyl-4-hydroxyphenyl)propionate (trade name: Irganox 1010; manufactured by BASF AG)

HP-3: Hexamethylenebis[3-(3,5-di-t-butyl-4-hydroxyphenyl)propionate] (trade name: Irganox 259; manufactured by BASF AG)

HP-4: Dibutylhydroxytoluene

HP-5: 3,9-Bis {2-[3-(3-t-butyl-4-hydroxy-5-methylphenyl)propionyloxy]-1,1-dimethylethyl}-2,4,8,10-tetraoxaspiro[5.5]undecane, N,N'-hexane-1,6-diylbis[3-(3,5-di-t-butyl-4-hydroxyphenyl)propionamide] (trade name: ADK STAB AO-80; manufactured by ADEKA CORPORATION)

HP-6: 2-[1-(2-Hydroxy-3,5-di-t-pentylphenypethyl]-4,6-di-t-pentylphenyl acrylate (trade name: Sumilizer GS(F); manufactured by Sumitomo Chemical Co., Ltd.)

TABLE 4

| | Steric-hindrance phenol | | | | | Formate |
| --- | --- | --- | --- | --- | --- | --- |
| | Type | Amount based on TOX (wt %) | Terminator Type | Polymerization yield wt % | Intrinsic viscosity dl/g | group content µmol/ g-polymer |
| Example 10 | HP-1 | 0.010 | STP-1 | 98.0 | 1.44 | 9.3 |
| Example 11 | HP-1 | 0.020 | STP-1 | 97.7 | 1.44 | 8.0 |
| Example 12 | HP-1 | 0.035 | STP-1 | 97.1 | 1.45 | 7.3 |
| Example 13 | HP-1 | 0.050 | STP-1 | 95.6 | 1.49 | 7.4 |
| Example 14 | HP-1 | 0.035 | STP-2 | 97.2 | 1.47 | 7.5 |
| Example 15 | HP-1 | 0.035 | STP-3 | 97.4 | 1.48 | 7.5 |
| Comparative example 9 | | Not added | STP-1 | 98.1 | 1.45 | 11.2 |

The abbreviations used in the table above have the following meanings:

STP-1: Triphenylphosphine
STP-2: Hexamethoxymethylmelamine
STP-3: Bis(1,2,2,6,6-pentamethyl-4-piperidinyl) sebacate It is found that the formate group content is small in each of Examples 1 to 9 in which the polymerization was conducted in the presence of a steric-hindrance phenol and the polymerization was terminated when the polymerization yield has reached at least 92%. Specifically, from a comparison of Examples 1 to 3 with Comparative Examples 1 to 3, it is found that when the polymerization yield is the same, the use of a steric-hindrance phenol in the polymerization can reduce the formate group content (see Table 1). In Example 4 in which the amount of boron trifluoride diethyl etherate was 0.02 mmol relative to 1 mol of the trioxane, a similar excellent reduction effect for the formate group content to Example 1 was exhibited at the same polymerization yield as in Example 1. On the other hand, in Comparative Example 4 in which the amount of boron trifluoride diethyl etherate was 0.07 mmol or more relative to 1 mol of the trioxane, the formate group content was increased even at the same polymerization yield as in Example 3 (see Table 2). In Comparative Example 6 in which ethylene oxide was used as a comonomer, when the amount of the polymerization catalyst added was the same as the amount of the catalyst added for 1,3-dioxolane, the polymerization yield was markedly lowered, increasing the cost of the monomer recovery, and, when the amount of the catalyst added was increased for increasing the polymerization yield like Comparative Example 5, the formate group content was markedly increased (see Table 3). When the polymerization yield is as low as about 80%, no difference is recognized between the case using a steric-hindrance phenol and the case using no steric-hindrance phenol (Comparative Examples 7 and 8). A comparison of Examples 10 to 15 with Comparative Example 9 shows that, under conditions presumed for the actual production facilities, the addition of a steric-hindrance phenol exhibits a reduction effect for the formate group. A comparison of Example 16 with Comparative Example 10 shows that, by adding a steric-hindrance phenol, excellent results are obtained with respect to the polymer quality of a final product, such as the amount of formalin generated and resident heat stability (see Table 4).

The invention claimed is:

1. A method for producing an oxymethylene copolymer by subjecting trioxane and 1,3-dioxolane to copolymerization using boron trifluoride or a coordination compound thereof as a catalyst, comprising:

charging a monomer mixture of the trioxane and 1,3-dioxolane with a steric-hindrance phenol in an amount of 0.006 to 2.0% by weight, based on the weight of the trioxane, then
conducting the copolymerization using 0.01 to 0.07 mmol of boron trifluoride or a coordination compound thereof as a catalyst, relative to 1 mol of the trioxane to form the oxymethylene copolymer, and then
contacting the formed oxymethylene copolymer and a polymerization terminator to terminate the polymerization when the polymerization yield has reached at least 92%;
wherein the trioxane monomer contains 0.00001 to 0.003 mmol of triethanolamine, relative to 1 mol of the trioxane.

2. The method for producing an oxymethylene copolymer according to claim 1, wherein a portion of or all of the steric-hindrance phenol is added through an inlet of a polymerizer.

3. The method for producing an oxymethylene copolymer according to claim 1, wherein the polymerization terminator is at least one compound selected from the group consisting of triphenylphosphine, a hindered amine, and an alkylated melamine.

4. The method for producing an oxymethylene copolymer according to claim 1, wherein the formed oxymethylene copolymer is contacted with the polymerization terminator when the polymerization yield has reached at least 97%.

5. The method for producing an oxymethylene copolymer according to claim 1, wherein the oxymethylene copolymer is continuously produced using a continuous polymerization apparatus comprising a continuous polymerizer and a terminator mixing machine which are connected in series.

6. A method for producing an oxymethylene copolymer, comprising: subjecting the oxymethylene copolymer obtained by the method for producing an oxymethylene copolymer according to claim 1 to stabilization treatment by further melt-kneading the oxymethylene copolymer at a temperature in the range of from the melting temperature of the oxymethylene copolymer to a temperature 100° C. higher than the melting temperature under a pressure of 760 to 0.1 mmHg.

7. The method for producing an oxymethylene copolymer according to claim 6, wherein the stabilization treatment is performed by means of an apparatus comprising a combination of a single-screw or twin- or multi-screw vented extruder and a surface renewal-type mixer.

8. The method for producing an oxymethylene copolymer according to claim 6, wherein the oxymethylene copolymer is subjected to the stabilization treatment without being washed after termination of the polymerization.

* * * * *